US011507961B2

(12) United States Patent
Scavotto

(10) Patent No.: US 11,507,961 B2
(45) Date of Patent: Nov. 22, 2022

(54) FABRICATED DATA DETECTION METHOD

(71) Applicant: United Technologies Corporation, Farmington, CT (US)

(72) Inventor: Karen Scavotto, Enfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 307 days.

(21) Appl. No.: 16/571,597

(22) Filed: Sep. 16, 2019

(65) Prior Publication Data

US 2020/0090186 A1   Mar. 19, 2020

Related U.S. Application Data

(60) Provisional application No. 62/731,515, filed on Sep. 14, 2018.

(51) Int. Cl.
*G06Q 30/00* (2012.01)
*G06F 16/2455* (2019.01)

(52) U.S. Cl.
CPC ..... *G06Q 30/0185* (2013.01); *G06F 16/2455* (2019.01)

(58) Field of Classification Search
CPC .................. G06Q 30/0185; G06F 16/2455
See application file for complete search history.

(56) References Cited

U.S. PATENT DOCUMENTS

| | | |
|---|---|---|
| 6,374,251 B1 | 4/2002 | Fayyad |
| 8,402,027 B1 | 3/2013 | Dange |
| 8,762,379 B2 | 6/2014 | Birdwell |
| 2014/0006468 A1* | 1/2014 | Kossovsky ............ G06Q 40/00 708/517 |
| 2015/0067422 A1* | 3/2015 | Hamilton ............... G06F 11/24 714/724 |
| 2016/0275269 A1* | 9/2016 | Buyse ..................... G16Z 99/00 |
| 2017/0262860 A1* | 9/2017 | Teplinsky .......... G06Q 30/0185 |
| 2017/0339168 A1* | 11/2017 | Balabine ............... G06F 16/951 |
| 2018/0046599 A1 | 2/2018 | Nagarajan |
| 2018/0107450 A1 | 4/2018 | Runkana |
| 2019/0385120 A1* | 12/2019 | Yu ......................... H04L 9/3239 |
| 2020/0053112 A1* | 2/2020 | Torisaki ............ H04L 12/40006 |

OTHER PUBLICATIONS

EP search report for EP19197630.7 dated Feb. 4, 2020.

* cited by examiner

*Primary Examiner* — Ilana L Spar
*Assistant Examiner* — Allan J Woodworth, II
(74) *Attorney, Agent, or Firm* — Getz Balich LLC

(57) ABSTRACT

Aspects of the disclosure are directed to receiving numerical product data indicative of a product, the numerical product data comprising numerical values indicative of at least one of chemical composition, radius, tensile strength, a diameter, position and yield strength, and storing the numerical product data in a non-volatile memory device. The numerical product data is processed in a processor to create a plurality of explanatory variables indicative of the numerical product data. Multivariate data analysis is performed on the explanatory variables indicative of the numerical product data, where the multivariate data analysis includes an iterative cluster based outlier detection procedure. A confidence indicator value indicative of the likelihood that the numerical product data includes at least one fabricated or false data entry is generated.

11 Claims, 10 Drawing Sheets

FABRICATED DATA DETECTION METHOD

This application claims priority to U.S. Patent Appln. No. 62/731,515 filed Sep. 14, 2018, which is hereby incorporated herein by reference in its entirety.

BACKGROUND OF THE INVENTION

1. Technical Field

The present disclosure relates to detecting false data associated with a component, more particularly to an automated technique that processes data indicative of a component to test for false/fabricated data.

2. Background Information

It is known that system manufacturers have been subjected to instances of fabricated/falsified data associated with component parts they receive. This may particularly be a problem for flight critical components. The fabricated/falsified data may originate for example in a material controls laboratory, from material testing, dimensional measurements, chemical composition data, mechanical test data, production acceptance inspections, supplier quality organizations, et cetera. The difficulties and expenses caused by components accompanied by fabricated/falsified data has created a need for increasing quality control processes on behalf of the vendor receiving the component.

There is a need for a processing technique that increases the likelihood of detecting fabricated and/or falsified data associated with a component.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a method of testing vendor supplied parts data to identify fabricated or false data entries. The method comprises receiving data indicative of a component received from a vendor, the data comprising at least one of tensile strength, a diameter, position and yield strength, and storing the test data in a non-volatile memory device. The data is processed in a processor to create a plurality of explanatory variables indicative of the test data, and multivariate data analysis is performed on the explanatory variables indicative of the data, where the multivariate data analysis includes an iterative cluster based outlier detection procedure. A confidence indicator value indicative of the likelihood that the data includes at least one fabricated or false data entry is then generated.

Performing multivariate data analysis using the explanatory variables may comprise performing K-means clustering and identifying cluster outliers to generate the confidence indicator.

The test data may comprise chemical composition data.

The test data may further comprise at least one of data indicative of a manufacturer of the part received, part number, description of the part received, and specification limits of the part received.

Receiving the test data may also comprise receiving at least one of chemical composition, true position, radius and air flow.

Aspects of the disclosure are also directed to receiving numerical product data indicative of a product, the numerical product data comprising numerical values indicative of at least one of chemical composition, radius, tensile strength, a diameter, position and yield strength, and storing the numerical product data in a non-volatile memory device. The numerical product data is processed in a processor to create a plurality of explanatory variables indicative of the numerical product data. Multivariate data analysis is performed on the explanatory variables indicative of the numerical product data, where the multivariate data analysis includes an iterative cluster based outlier detection procedure. A confidence indicator value indicative of the likelihood that the numerical product data includes at least one fabricated or false data entry is generated.

The performing multivariate data analysis using the explanatory variables may comprise performing K-means clustering and identifying cluster outliers to generate the confidence indicator.

DETAILED DESCRIPTION

Figure 1:
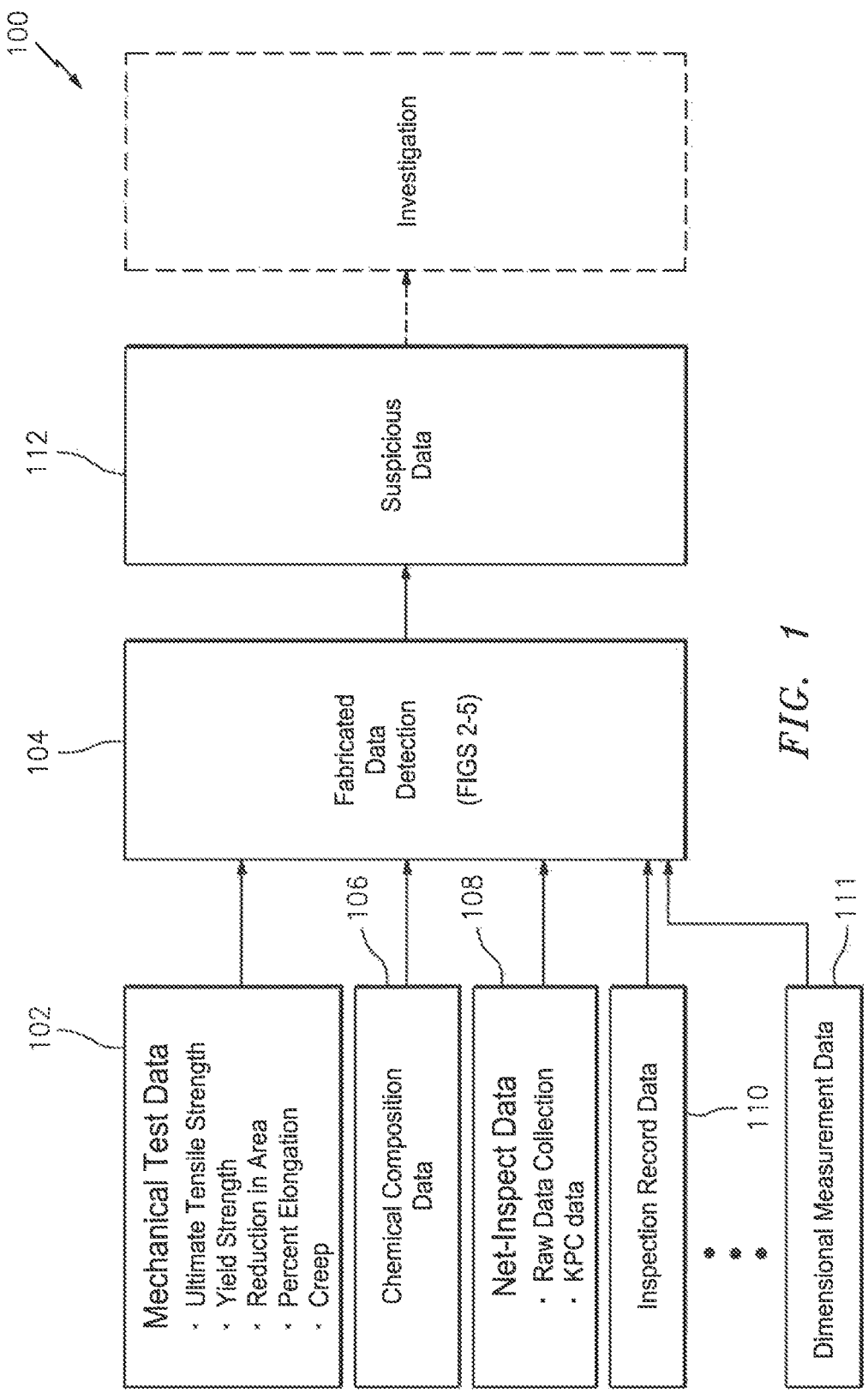
FIG. 1 is a simplified block diagram illustration of processing associated with detecting false and/or fabricated data associated with a delivered product.

FIG. 1 is a simplified block diagram illustration of processing 100 associated with detecting false or fabricated data associated with a delivered product. The delivered product may be a finished component to be assembled into a larger system, or material to be used to manufacture a product. For example, the finished component may be a part of an aircraft gas turbine engine, or material to be used to manufacture a component of an aircraft gas turbine engine. However, it is contemplated that processing techniques of the present disclosure may be used in quality control applications for many different components and materials to ensure quality of delivered components and materials.

Referring to FIG. 1, in step 102 test data (e.g., mechanical test data) associated with a delivered component is input to a fabricated data detector 104. The test data provided in step 102 may include for example ultimate tensile strength, yield strength, reduction in area, percent elongation, creep, et cetera, of the delivered component. The test data provides a quantitative description of the delivered component from which mechanical properties of the delivered component can be assessed.

In step 106, chemical composition data of the delivered component may also be input to the fabricated data detector 104.

In step 108 the fabricated data detector 104 may also be provided with net-inspect data, such as for example, raw collected data, key product characteristic (KPC) data, et cetera. Similarly, in step 110 inspection record data may also be provided to the fabricated data detector 104. The inspection record data may include for example data indicative of the manufacturer of the delivered component, part number, description of the delivered component, specification limits, et cetera, associated with the delivered component. In step 111 dimensional measurement data is input to the fabricated data detector 104.

The fabricated data detector 104 receives the data provided in one or more of steps 102, 106, 108, 110 and 111, processes the received data, and identifies suspicious data 112 that can be further received.

Figure 2:
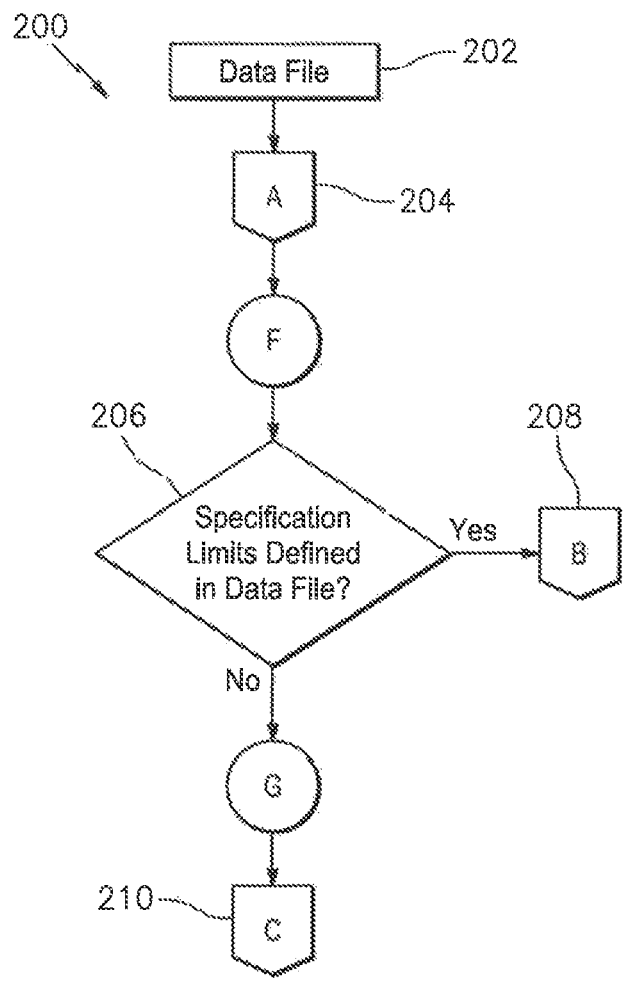
FIG. 2 is a simplified flow chart illustration of processing illustrated in FIG. 1.

FIG. 2 is a simplified flow chart illustration 200 of the processing illustrated in FIG. 1. In step 202 data indicative of a component (e.g., data 102, 106, 108, 110 and 111 illustrated in FIG. 1) is received for subsequent processing in routine A 204.

Figure 3:
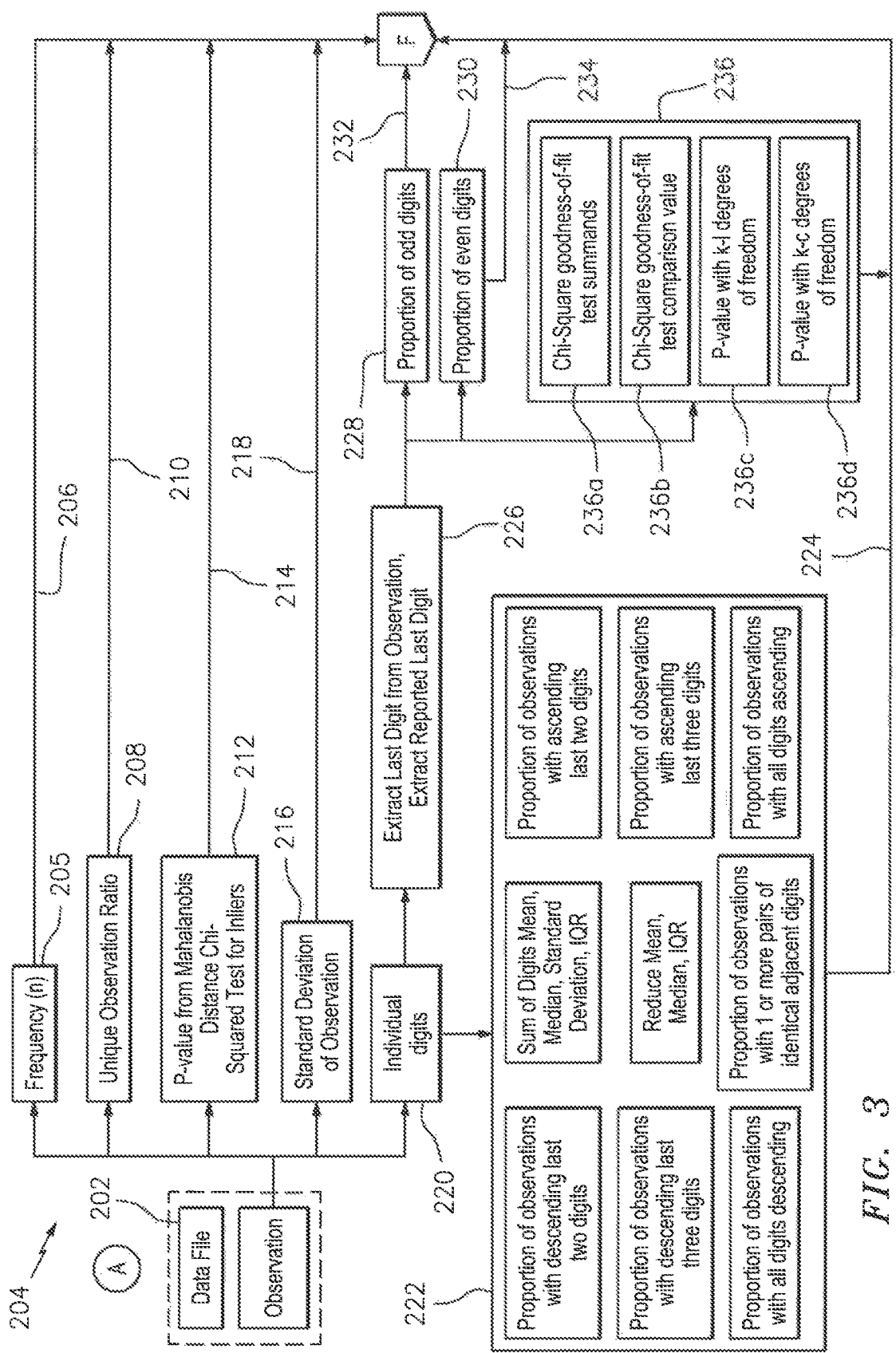
FIG. 3 is a flow chart illustration of processing steps of routine A illustrated in FIG. 2.

FIG. 3 is a flow chart illustration of processing steps 204 of routine A illustrated in FIG. 2. The data 202 contains observations, which are quantitative values based upon test, measurement or observation of the component. For example, the observations may include a diameter value, a true position value, a tensile strength value, a chemical composition percentage, et cetera. The observations are processed to create associated explanatory variables that describe the observations, and then multivariate data analysis is performed on the explanatory variables to assess if specific data entries appear suspicious when compared collectively to all other data input to the fabricated data detector 104 (FIG. 1). The variables identify attributes of a number/collection of numbers (e.g., multiple serial numbers for a part number or all of a supplier's measurement data regardless of characteristic type). The data may be processed in a unit less manner—the explanatory variables are based upon the number data itself, and not the units of the data. The explanatory variables identify a number's attributes. The explanatory variables may describe, for example, the actual number, digits, pattern of digits, what other information you can get from a number itself, et cetera. So then when it gets to the clustering portion, the numbers that are similar are grouped together and ones that don't follow the "common trend" would be flagged as suspicious (different).

Referring still to FIG. 3, the observations are processed in a frequency determination unit 205 that counts the number of observations and outputs a count number on line 206. The observations are also processed in a unique observation ratio determination unit 208 that determines the number of occurrences of different quantitative values and outputs an index indicative thereof on line 210. An inliers determination unit 212 also receives the observations and processes the observations, using for example a P-value from Mahalanobis Distance Chi-Squared Test for Inliers, to provide explanatory data indicative thereof on line 214. In an alternative embodiment the inliers determination unit 212 may be moved to the processing to be discussed with respect to FIG. 5.

A standard deviation of observation unit 216 processes the observations to provide a standard deviation (e.g., based on the counter value on the line 206), and provides the standard deviation data indicative thereof on line 218.

An individual digits determination unit 220 also processes the observations. This unit may provide a number of different processing steps 222, including for example, steps to determine:

1. proportions of observations with descending last two digits;
2. proportions of observations with descending last three digits;
3. proportions of observations with all digits descending;
4. sum of digits mean, median, standard deviation, and interquartile range (IQR);
5. reduce mean, median, IQR;
6. proportion of observations with 1 or more pairs of identical adjacent digits;
7. proportion of observations with ascending last two digits;
8. proportion of observations with ascending last three digits; and
9. proportion of observations with all digits ascending.

The resultant information from the determinations 222 is output on line 224.

Unit 226 further processes the observations to extract the last digit and reported last digit, and units 228 and 230 determine the proportion of odd digits and the proportion of even digits, respectively, and results are output on lines 232, 234, respectively. The extracted last digit and reported last digit data is processed in a unit 236, which includes a number of sub-units 236a-236d. For example, the extracted last digit data may be processed to perform a chi-square goodness-of-fit test summands for i=1, 2, . . . , 9 where i is the bin and each bin corresponds to reported last digit from 1, 2 . . . , 9. Where reported last digit removes trailing zeros. For last digit and reported last digit, a Chi-Square goodness-of-fit test routine may provide reference values, summands that describes the weighted squared difference between expected frequency and observed frequency for each possible digit. The sum of the weighted difference for each possible value of last digit (0, 1, . . . , 9) provides a Chi-Square goodness-of-fit test comparison value. This comparison value is then quantified as a p-value using degrees of freedom equal to number of bins minus one and a p-value using degrees of freedom equal to number of bins minus number of estimated parameters.

Upon the completion of the processing steps illustrated in FIG. 3, processing returns to test 206 illustrated in FIG. 2. Referring again to FIG. 2, if specification limits are defined in the received data file, then processing proceeds to routine B 208. However, if the specification limits are not defined in the received data filed, then processing proceeds to routine C 210.

Figure 4:
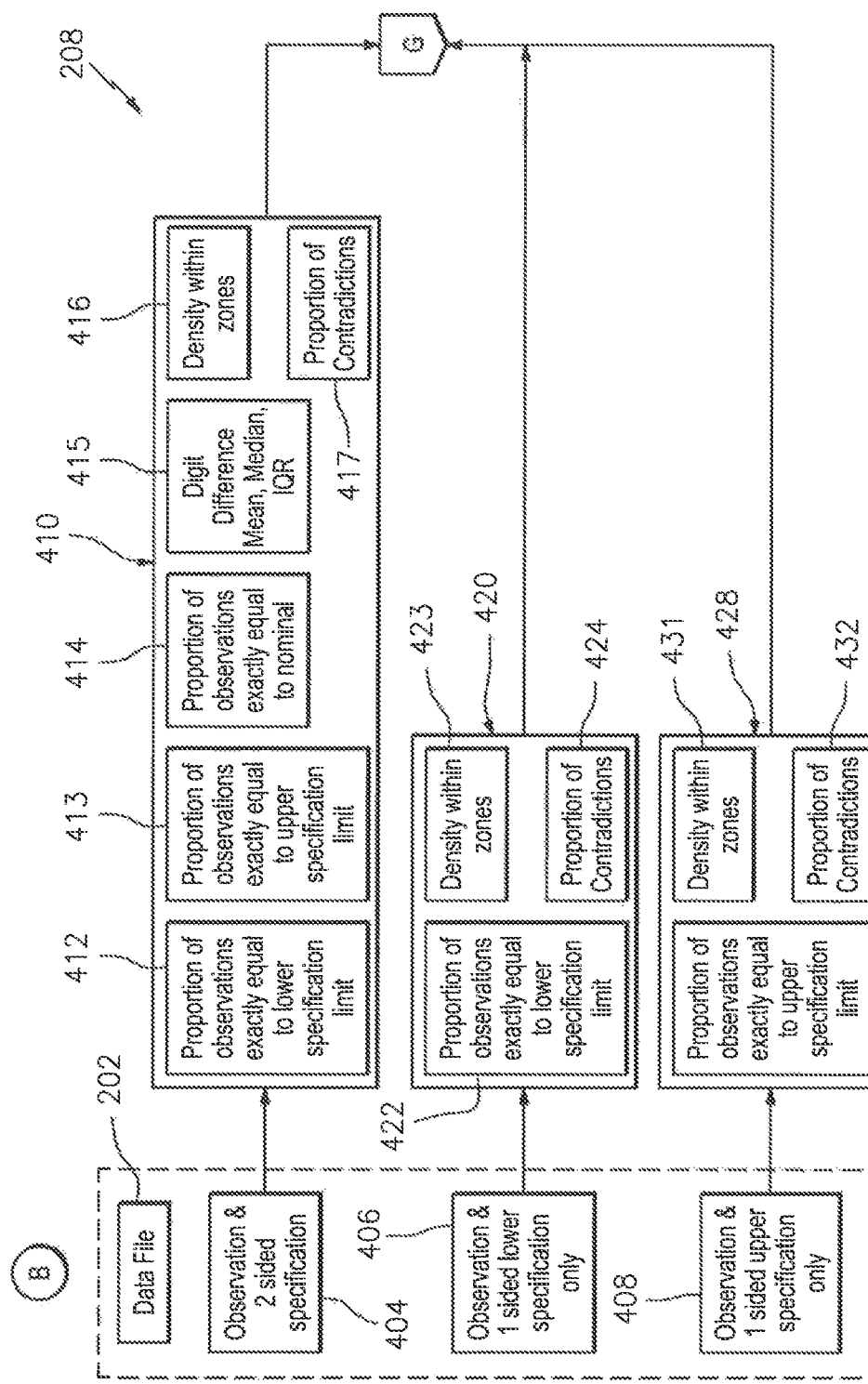
FIG. 4 is a flow chart illustration of processing steps of routine B illustrated in FIG. 2.

FIG. 4 is a flow chart illustration of a processing steps 208 of routine B illustrated in FIG. 2. In this case since the data file includes specification limits, the observation value and the specification limits are provided for subsequent processing. For example, the data provided may include observations and specification limits containing a lower and upper bound 404, observations and an associated minimum requirement/limit 406, and observations and an associated maximum requirement/limit 408. The observations having specification limits containing a lower and upper bound 404 are input to processing 410 that includes determination units 412-417 to determine for example:

1. proportions of observations exactly equal to lower specification limit;

2. proportions of observations exactly equal to upper specification limit;
3. proportion of observations exactly equal to nominal;
4. digit difference mean, median and IQR;
5. density within zones; and
6. proportion of contradictions.

Referring still to FIG. 4, the data provided from observations and 1 sided lower specification only 406 are input to processing 420 that includes determination units 422-424 to determine for example:
1. proportions of observations exactly equal to lower specification limit;
2. density within zones; and
3. proportion of contradictions.

The data provided from observations and 1 sided upper specification only 408 are input to processing 428 that includes determination units 430-432 to determine for example:
1. proportions of observations exactly equal to upper specification limit;
2. density within zones; and
3. proportion of contradictions.

Upon the completion of processing 410, 420 and 428 the processing proceeds to routine C 210 (FIG. 2).

Figure 5:
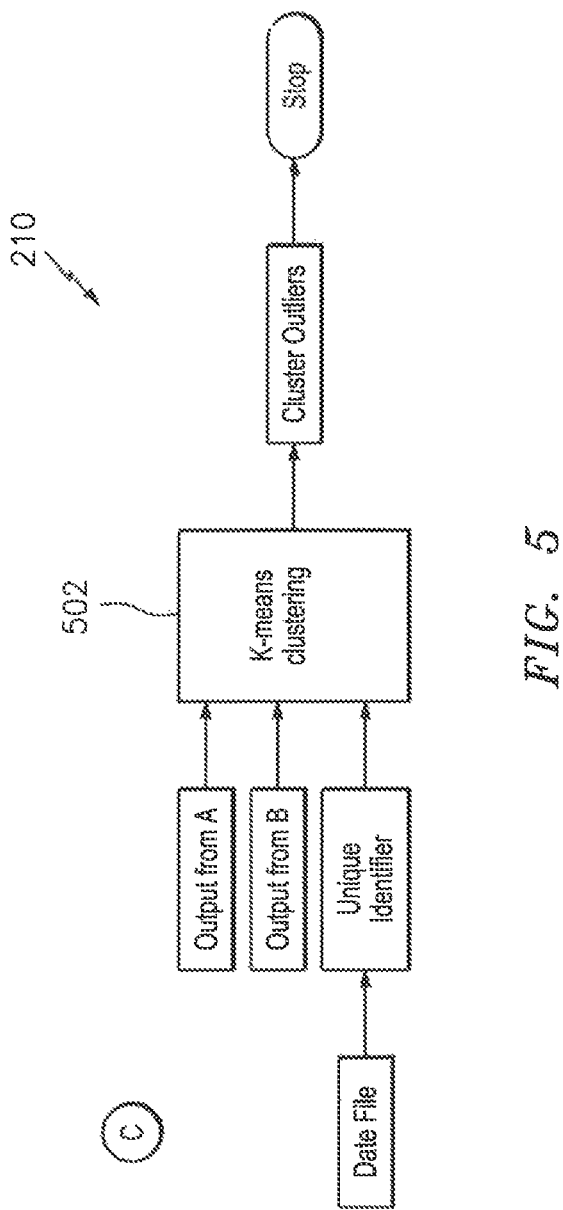
FIG. 5 is a flow chart illustration of processing steps of routine C illustrated in FIG. 2.

FIG. 5 is a flow chart illustration of processing steps 210 of routine C illustrated in FIG. 2. A K-means clustering unit 502 receives a combination of applicable explanatory variables from routine A 204 (FIG. 3), routine B 208 (FIG. 4) and the data file 202 (FIG. 2). K-means clustering is a known method of vector quantization, originally from signal processing, which is popular for cluster analysis in data mining. Explanatory variables (or appropriate subset of explanatory variables) are input into an iterative cluster based outlier detection procedure. K-Means clustering is used to group observations by unique identifiers and similarity of explanatory variables. The procedure may begin with k=1 clusters and determines if outliers are present based on extreme distances to the center of assigned cluster and multivariate T2 values greater or less than threshold values. If a unique identifier is considered an outlier, it is removed from the data set and number of clusters is set to k=2 and the evaluation for outliers is repeated. The cluster size is incremented until the average distance to cluster centers remains constant when k is increased by one or until no outliers are detected.

Figure 10:
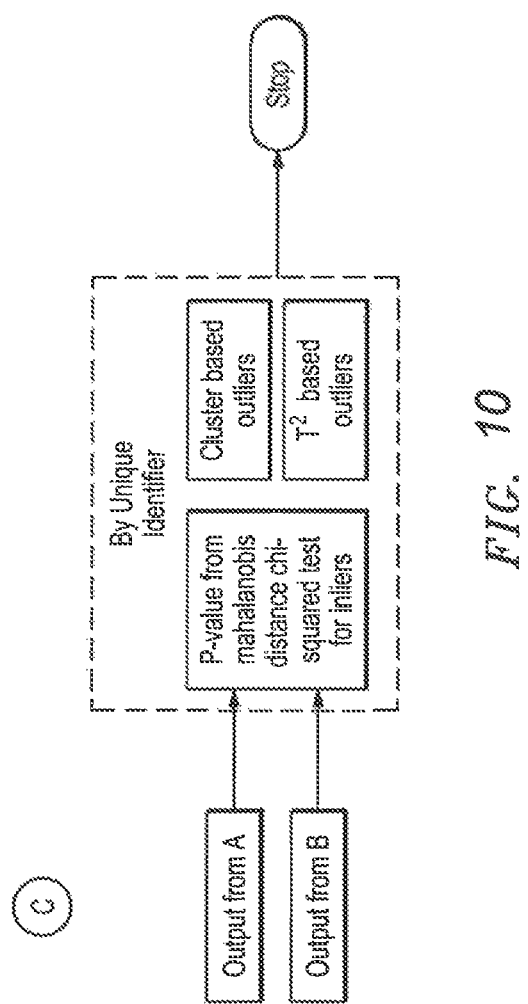
FIG. 10 is a flow chart illustration of an alternative embodiment of processing steps of routine C illustrated in FIG. 5.

FIG. 10 is a flow chart illustration of an alternative embodiment of processing steps of routine C illustrated in FIG. 5. In this embodiment, the processing of FIG. 10 is substantially the same as the processing of FIG. 5 with the principal exception that inliers determination unit 212 (e.g., the P-value from Mahalanobis Distance Chi-Squared Test for Inliers) illustrated in FIG. 3 is moved downstream in the processing flow as now shown in FIG. 10.

Figure 6:
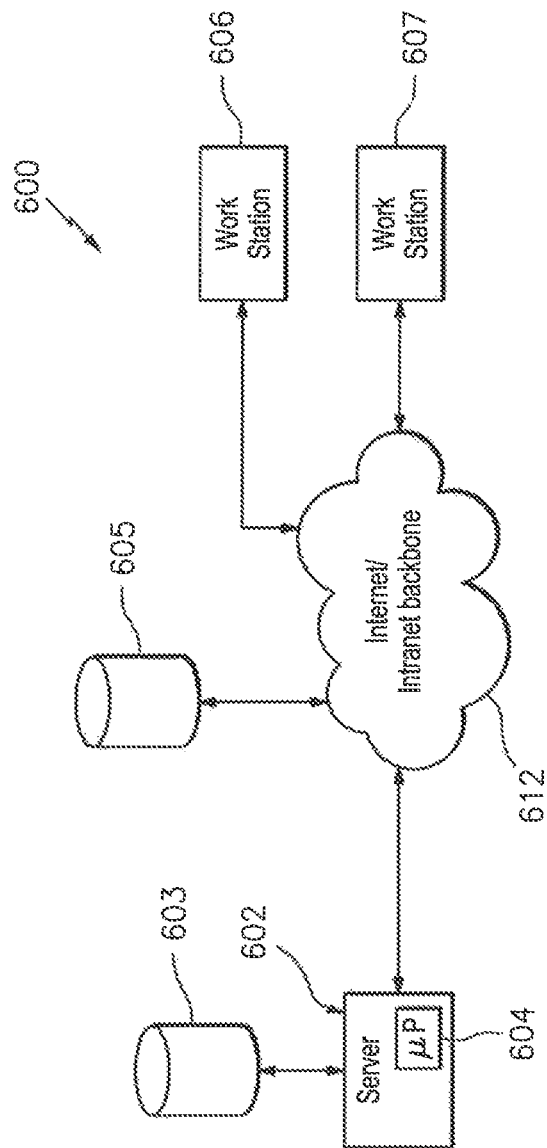
FIG. 6 is a pictorial illustration of a processing system that may execute the process set forth in FIGS. 1-5.

FIG. 6 is a pictorial illustration of a processing system 600 that may execute the processes set forth in FIGS. 1-5. The system includes a server 602 having a memory 603 that contains executable program instructions and a processor 604 that executes the executable program instructions. The system also includes a database 605 that may be located in the memory device 603 or located remotely. The server 602 may include a display and input/output devices (e.g., keyboard, mouse, printer, flash drives, et cetera). The system 600 may also include work stations 606, 607 located at vendor sites for them to transfer component test data. Each of the work stations 606, 607 includes a work station having a computer (e.g., a PC, laptop, tablet, handheld computing device, et cetera). Each work station 606, 607 communicates over a packet switched network 612 (e.g., the internet) with the server 602.

Figure 7:
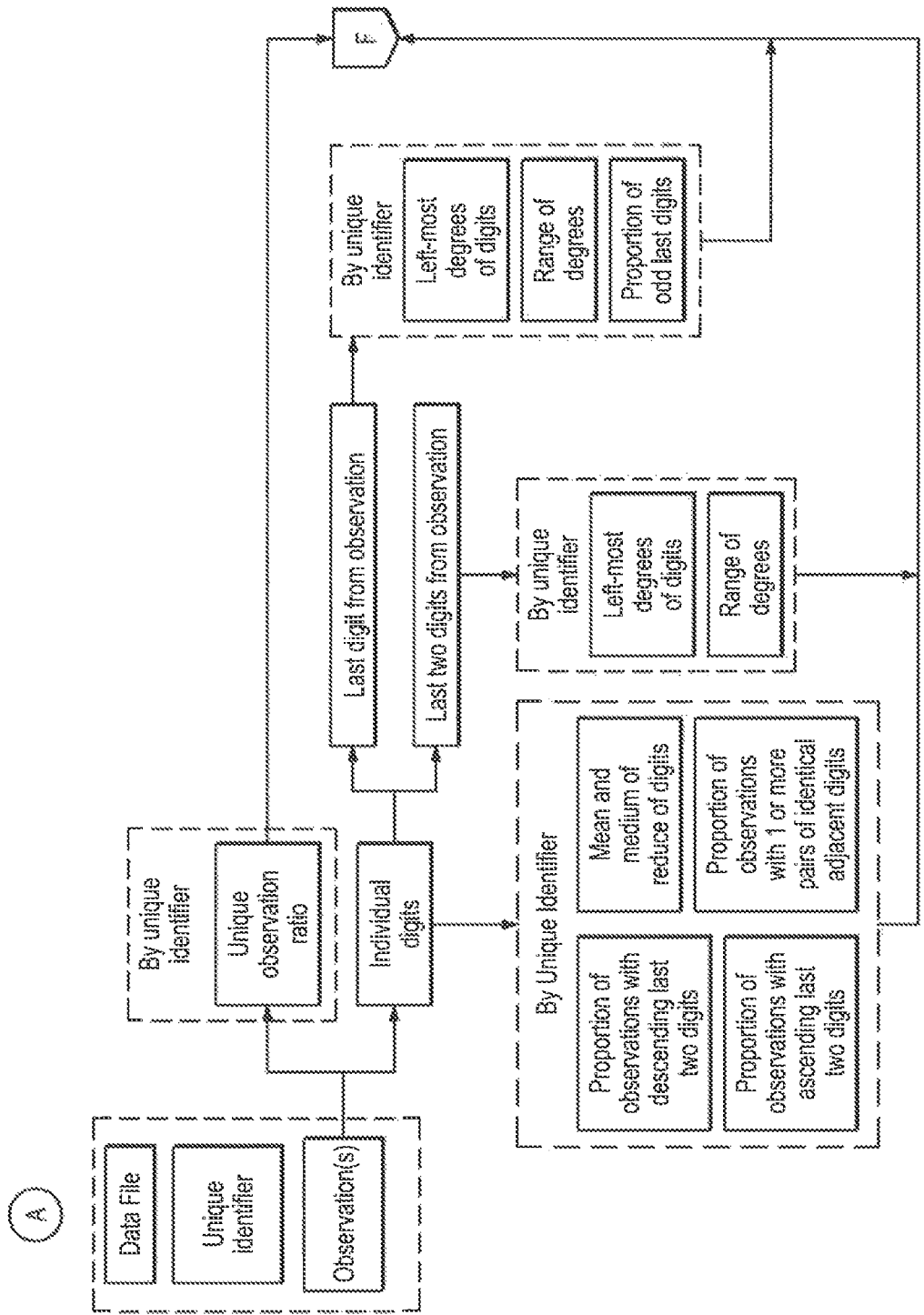
FIGS. 7-9 are flow chart illustrations of alternative embodiment processing steps of routines A, B, C illustrated in FIGS. 3-5, respectively.
Figure 8:
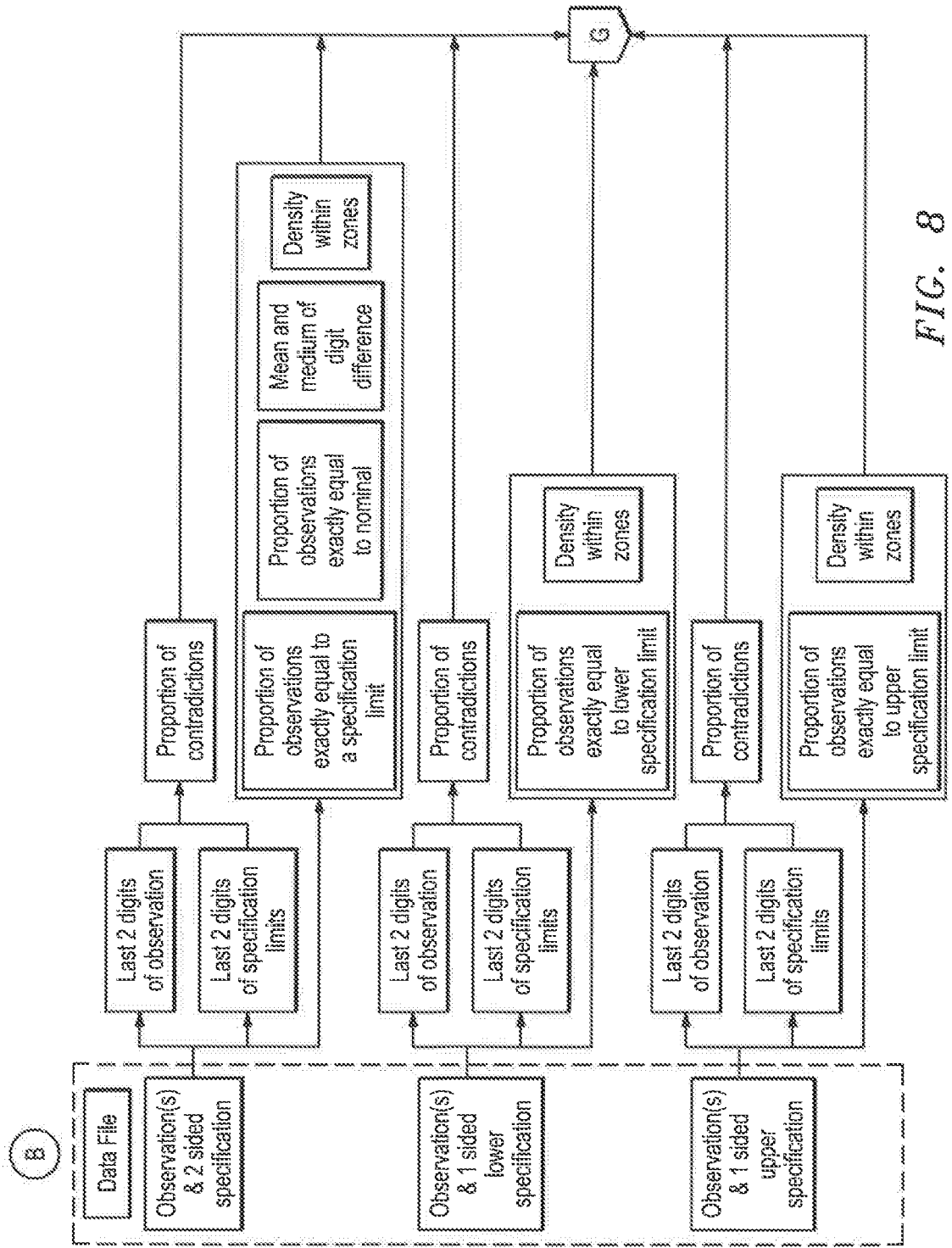
Figure 9:
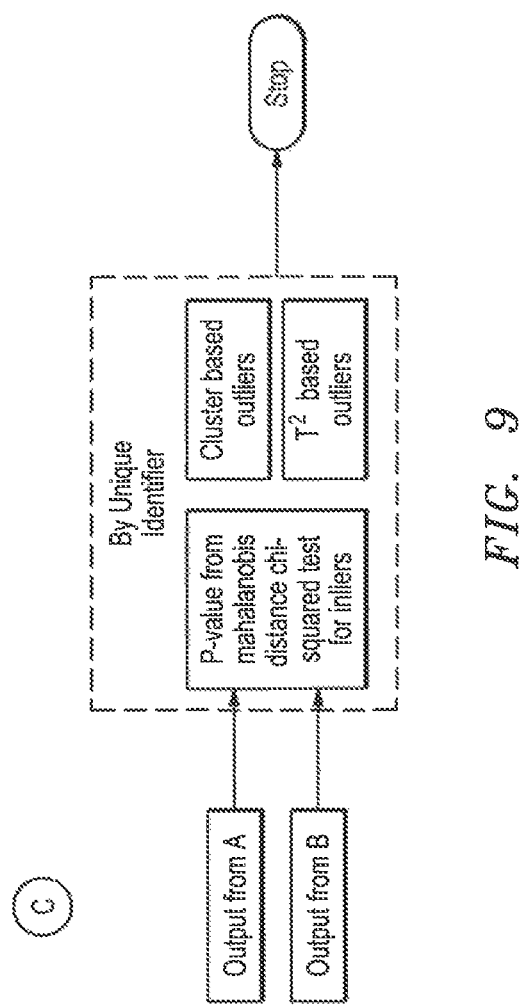

FIGS. 7-9 are flow chart illustrations of alternative embodiment processing steps of routines A, B, C illustrated in FIGS. 3-5, respectively. The embodiment of FIGS. 7-9 is substantially the same as the embodiments of FIGS. 3-5 and 10, but uses slightly different explanatory variables to be processed to generate confidence indicator values that can used to identify possible fabricated or false data (e.g., indicate of vendor supplied parts).

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:
1. A computer-implemented method, executed using a processor, for identifying at least one fabricated or false data entry in test data for a plurality of components, the method comprising:
providing the test data for the plurality of components, the test data relating to at least one of a tensile strength, a diameter, a position, or a yield strength, the test data including a data set for each said component of the plurality of components, each respective said data set including at least one test value, and each said test value having at least one individual digit, a plurality of test values for the test data including the at least one test value of each said data set of the test data;
processing the test data in the processor to create a plurality of explanatory variables for the plurality of test values, each said explanatory variable identifying an attribute of one or more of the at least one individual digit of each said test value of the plurality of test values;
comparing all of the plurality of explanatory variables for the test data by grouping the plurality of explanatory variables using an iterative K-means clustering technique to identify one or more outlier explanatory variables in the grouped plurality of explanatory variables;
generating a confidence indicator on a confidence indicator scale, the confidence indicator value based on an identification of the one or more outlier explanatory variables, the confidence indicator value as a function of the confidence indicator scale representing a likelihood that one or more test values of the plurality of test values is a fabricated or false test value; and
identifying the one or more fabricated or false test values of the plurality of test values, based on the confidence indicator value.

2. The method of claim 1, where the test data comprises at least one chemical composition test value.

3. The method of claim 1, where the test data further comprises at least one of data indicative of a manufacturer of the part received, part number, description of the part received, and specification limits of the part received.

4. The method of claim 1, where the receiving the test data also comprises receiving at least one of chemical composition, true position, radius and air flow.

5. The method of claim 1, further comprising receiving the plurality of components from the vendor, wherein each said component of the plurality of components is an aircraft gas turbine engine component.

6. The method of claim 1, wherein a first test value of the plurality of test values is a first mechanical property of a first component of the plurality of components, wherein a second test value of the plurality of test values is a second mechanical property of a second component of the plurality of components, and wherein the first mechanical property is different than the second mechanical property.

7. The method of claim 1, wherein a first component of the plurality of components is different than a second component of the plurality of components.

8. A system for identifying the presence or absence of a fabricated or false data entry in test data for a plurality of components, the test data relating to at least one of a tensile strength, a diameter, a position, or a yield strength, the test data including a data set for each said component of the plurality of components, each respective said data set including at least one test value, and each said test value having at least one individual digit, a plurality of test values for the test data including the at least one test valve of each said data set of the test data, the system comprising:
  a processor in communication with a non-transitory memory storing instructions, which instructions when executed cause the processor to:
    process the test data to create a plurality of explanatory variables for the plurality of test values, each said explanatory variable identifying an attribute of one or more of the at least one individual digit of each said test value of the plurality of test values;
    compare all of the plurality of explanatory variables for the test data by grouping the plurality of explanatory variables using an iterative K-means clustering technique to identify one or more outlier explanatory variables in the grouped plurality of explanatory variables;
    generate a confidence indicator value on a confidence indicator scale, the confidence indicator value based on an identification of the one or more outlier explanatory variables, the confidence indicator value as a function of the confidence indicator scale representing a likelihood of the presence or absence of a fabricated or false test value; and
    if the confidence indicator value as a function of the confidence indicator scale indicates the likelihood of the presence of one or more fabricated or false test values within the plurality of test values, identify the one or more said test values likely to be a said fabricated or false test value.

9. The system of claim 8, wherein the test data further includes at least one chemical composition test value.

10. The system of claim 8, wherein a first test value of the plurality of test values is a first mechanical property of a first component of the plurality of components, wherein a second test value of the plurality of test values is a second mechanical property of a second component of the plurality of components, and wherein the first mechanical property is different than the second mechanical property.

11. The system of claim 8, wherein a first component of the plurality of components is different than a second component of the plurality of components.

\* \* \* \* \*